United States Patent
Klee, Jr.

(10) Patent No.: US 11,366,785 B1
(45) Date of Patent: Jun. 21, 2022

(54) METHOD AND SYSTEM FOR TRANSPARENT DATABASE COMMAND REPLACEMENT

(71) Applicant: David Anthony Klee, Jr., Lincoln, NE (US)

(72) Inventor: David Anthony Klee, Jr., Lincoln, NE (US)

( * ) Notice: Subject to any disclaimer, the term of this patent is extended or adjusted under 35 U.S.C. 154(b) by 337 days.

(21) Appl. No.: 16/675,672

(22) Filed: Nov. 6, 2019

Related U.S. Application Data

(60) Provisional application No. 62/757,261, filed on Nov. 8, 2018.

(51) Int. Cl.
*G06F 16/11* (2019.01)
*H04L 67/568* (2022.01)
*H04L 69/16* (2022.01)

(52) U.S. Cl.
CPC .......... *G06F 16/11* (2019.01); *H04L 67/2842* (2013.01); *H04L 69/16* (2013.01)

(58) Field of Classification Search
CPC ........ G06F 16/00–16/128; H04L 69/16; H04L 67/28–67/2852
See application file for complete search history.

(56) References Cited

U.S. PATENT DOCUMENTS

| | | | | |
|---|---|---|---|---|
| 8,543,554 B1 * | 9/2013 | Singh | ................ | G06F 16/24552 707/690 |
| 9,531,607 B1 * | 12/2016 | Pai | .......................... | H04L 43/16 |
| 2013/0018765 A1 * | 1/2013 | Fork | ................... | G06F 9/45558 705/34 |
| 2016/0098448 A1 * | 4/2016 | McShane | .......... | G06F 16/24534 707/713 |
| 2020/0134070 A1 * | 4/2020 | Sidoti | ..................... | G06F 16/23 |

\* cited by examiner

*Primary Examiner* — Clayton R Williams
(74) *Attorney, Agent, or Firm* — Suiter Swantz pc llo

(57) ABSTRACT

A database command replacer intercepts database commands to one or more database servers, extracts the database command and defined parameters within the command, and determines if the database command is defined in the list of commands subject to replacement; if not, the command is passed through to the destination database server. If the database command is in the list of commands subject to replacement, the replacement command is retrieved, the mapped parameter values are incorporated into the replacement command, the replacement command is transmitted to the destination database server, and the resultant information is relayed back to the origination program. No changes are required to either the client or server software in existing client/server database arrangements.

17 Claims, 10 Drawing Sheets

US 11,366,785 B1

METHOD AND SYSTEM FOR TRANSPARENT DATABASE COMMAND REPLACEMENT

PRIORITY

The present application claims the benefit under 35 U.S.C. § 119(e) of U.S. Provisional App. No, 62/757,261 (filed Nov. 8, 2018), which is incorporated herein by reference.

FIELD OF THE INVENTION

Embodiments of the inventive concepts disclosed herein are directed generally toward computer databases and computer database access management.

BACKGROUND

In a client/server database architecture, software applications make database commands via a network to one or more database servers. The database server executes the commands, either in the form of a query or a more sophisticated stored procedure, and returns the results to the software application that requested them.

For every query performed by the application, the database server processes the structured database query, compiles it into a form that can be understood by the database engine, physically fetches the data from either the database buffer pool in memory or from the disk systems, filters and processes the data so that it fulfills the command requirements, and sends the data to the application. This process produces considerable overhead for applications that access the database system intensively.

Database commands originate from within the application itself. In many cases, these commands are compiled into the underlying software application and may be sub-optimal, Sub-optimal commands are those that are constructed inefficiently, causing the overall runtime or resource consumption of the query to be greater than expected, Sub-optimal queries originate from items such as poor query construction, inefficient use of available features, etc. Because the commands are compiled into the underlying software application, sub-optimal database commands may be used with no possibility of allowing the software user to make improvements.

Currently, these deficiencies are addressed with faster computer servers to compensate. Additional hardware increases setup costs and operating costs, and is only a short-term solution, as the hardware might not withstand future demand or software changes.

It would be advantageous if a system and method existed for correcting sub-optimal command structures without altering application code.

SUMMARY

In one aspect, embodiments of the inventive concepts disclosed herein are directed to a system and method for improving the reliability of client/server database execution. Commands sent by a client to a database server are intercepted. The commands are analyzed according to a set of parameters to identify command components likely to result hi inefficient execution. Those command components are replaced and the restructured command sent to the server.

In a further aspect, replacement command components are associated with the command components likely to result in inefficient execution and replaced without analysis during subsequent executions.

In a further aspect, command execution performance is monitored to identify command components that are likely to result in inefficient execution.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
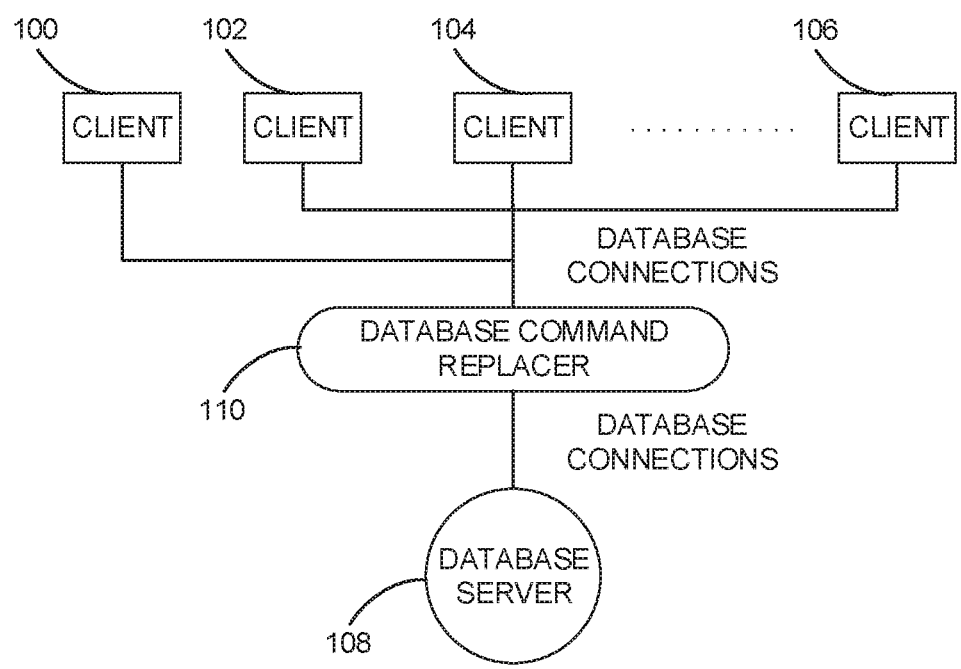
FIG. 1 shows a block diagram of a network architecture suitable for implementing embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1 b), Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for improving the reliability of client/server database execution by intercepting the commands, analyzing according to a set of parameters to identify command components likely to result in inefficient execution, and replacing those components.

Referring to FIG. 1, a block diagram of a network architecture suitable for implementing embodiments of the present disclosure is shown. In at least one embodiment, a system includes one or more clients 100, 102, 104, 106 in data communication with a database server 108, Each of the one or more clients 100, 102, 104, 106 execute applications such as web servers, application servers, application programs, etc, utilizing data accessed from the database server 108, accessed by transmitting the necessary server commands via a common IP address or fully qualified domain name (FQDN) and specific port on the database server 108. The database server 108 transmits results back to the IP address or FQDN that originated the query (corresponding to the one or more clients 100, 102, 104, 106). Usually an authentication process precedes the server commands, in which the client 100, 102, 104, 106 provides the database server 108 with authentication credentials such as a username and password, and the database server 108 establishes a connection, identified by a connection number, so that the database server 108 can continuously maintain the authentication for this connection. In at least one embodiment, the database server 108 is a single computer system.

A database command replacer 110 is interposed in the network path between the one or more clients 100, 102, 104, 106 and the database server 108. The database command replacer 110 comprises an application, module, or software process executing on the same computer as the database server 108 or another server apparatus in the architecture wherein the database command replacer 110 may intercept all database command from the one or more clients 100, 102, 104, 106 to the database server 108. The database command replacer 110 may be configured to monitor traffic to a specific port and IP address, FQDN, etc., associated with the database server 108.

The database command replacer 110 is configured for incoming command parameterization, retrieval of defined replacement commands, parameter mapping, and/or query routing, as more fully described herein. While each function is advantageous in improving the functionality of the system, the functions also interact synergistically.

In at least one embodiment, the database command replacer 110 parameterizes an incoming command from a client 100, 102, 104, 106 and attempts to match the command a maintained list of commands so be replaced. If the command does not appear on the list, the command is passed through and transmitted to the database server 108. A response code and any requested data are sent back to the originating application.

If the command does appear on the list, the replacement command is retrieved from the list; the command parameters are mapped and values transferred from the original command to the replacement command and the replacement command is transmitted to the database server 108. The response code and any requested data are then sent back to the originating application. The application is not aware that the replacement command was sent.

In at least one embodiment, the database command replacer 110 may monitor process execution time my logging when a command is passed through and when a response is returned. Commands with execution time above a specified threshold may be flagged for potential review and replacement. In at least one embodiment, the recorded data set of commands and execution times, along with corresponding parameters, may be used to train a neural network for identify database commands suitable for replacement. For example, training data sets may be compiled into sets of database commands configured to produce substantially similar results given similar parameters. In at least one embodiment, parameter ranges may be a driving factor in execution time of related database command functions; for example, where a query includes a data range, one magnitude of date ranges may be more efficiently processed with a first database command while a second, larger magnitude of date ranges may be processed more efficiently by a replacement database command. Machine learning algorithms may identify such parameter range distinctions.

In at least one embodiment, training data sets may be categorized based on a defined Level of stability or instability, and provided in ascending order of convergence such that the disparities between stable and unstable approaches diminish during training and necessary adjustments presumably become smatter over time according to first and second order deviations of the corresponding loss function. The loss function, defined to minimize execution time and resource allocation, may define error according to mean square, root mean square, normalized square, a weighted square, or some combination thereof, where the gradient of the loss function may be calculated via backpropagation.

In at least one embodiment, the adjustments may be based on minimizing multidimensional toss functions, such as through first or second order derivatives. Alternatively, or in addition, the designers may iteratively simplify the process to focus on a single-dimension loss function at one time. Training algorithms suitable for embodiments of the present disclosure may include, but are not limited to, gradient descent where the Loss function is iteratively limited to a single variable, Conjugate gradient, Newton's method, Quasi-Newton method, Levenberg-Marquardt, etc.

Figure 2:
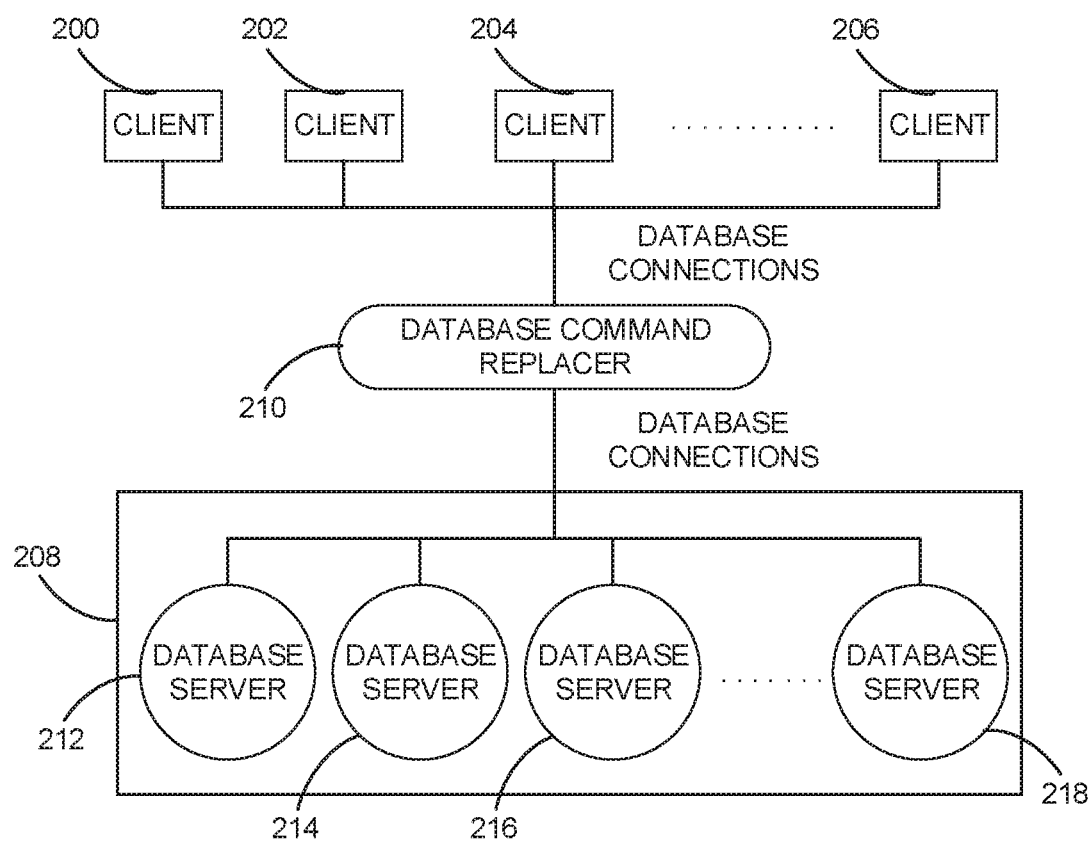
FIG. 2 shows a block diagram of a network architecture suitable for implementing embodiments of the present disclosure.

Referring to FIG. 2, a block diagram of a network architecture suitable for implementing embodiments of the present disclosure is shown. In at least one embodiment, a system includes one or more clients 200, 202, 204, 206 in data communication with a cluster 208 of database servers 212, 214, 216, 218, that execute applications accessing one or more database servers 212, 214, 216, 218 in the cluster 208. In at least one embodiment, the cluster 208 is configured to appear to the one or more clients 200, 202, 204, 206 as a single database server reached via a single IP address or FQDN and port number combination. The one or more clients 200, 202, 204, 206 (and/or the applications executing on those clients 200, 202, 204, 206) may or may not be cluster aware. In at least one embodiment, the cluster 208 may be configured for improved load distribution or improved availability.

A database command replacer 210 is interposed between the one or more clients 200, 202, 204, 206 and the cluster 208. The database commend replacer 210 includes all the functionality described with respect to a single database server architecture as more fully described herein. In addition, the database command replacer 210 may be aware of the specific identities of individual database servers 212, 214, 216, 218. Each database server 212, 214, 216, 218 may have particular characteristics corresponding to the specific hardware of the database server 212, 214, 216, 218, or to a dataset on a particular database server 212, 214, 216, 218 in a distributed data environment. In such case, certain command replacement metrics used by the database command replacer 210 may be specific to the particular database server 212, 214, 216, 218 that actually services a particular request.

Figure 3A:
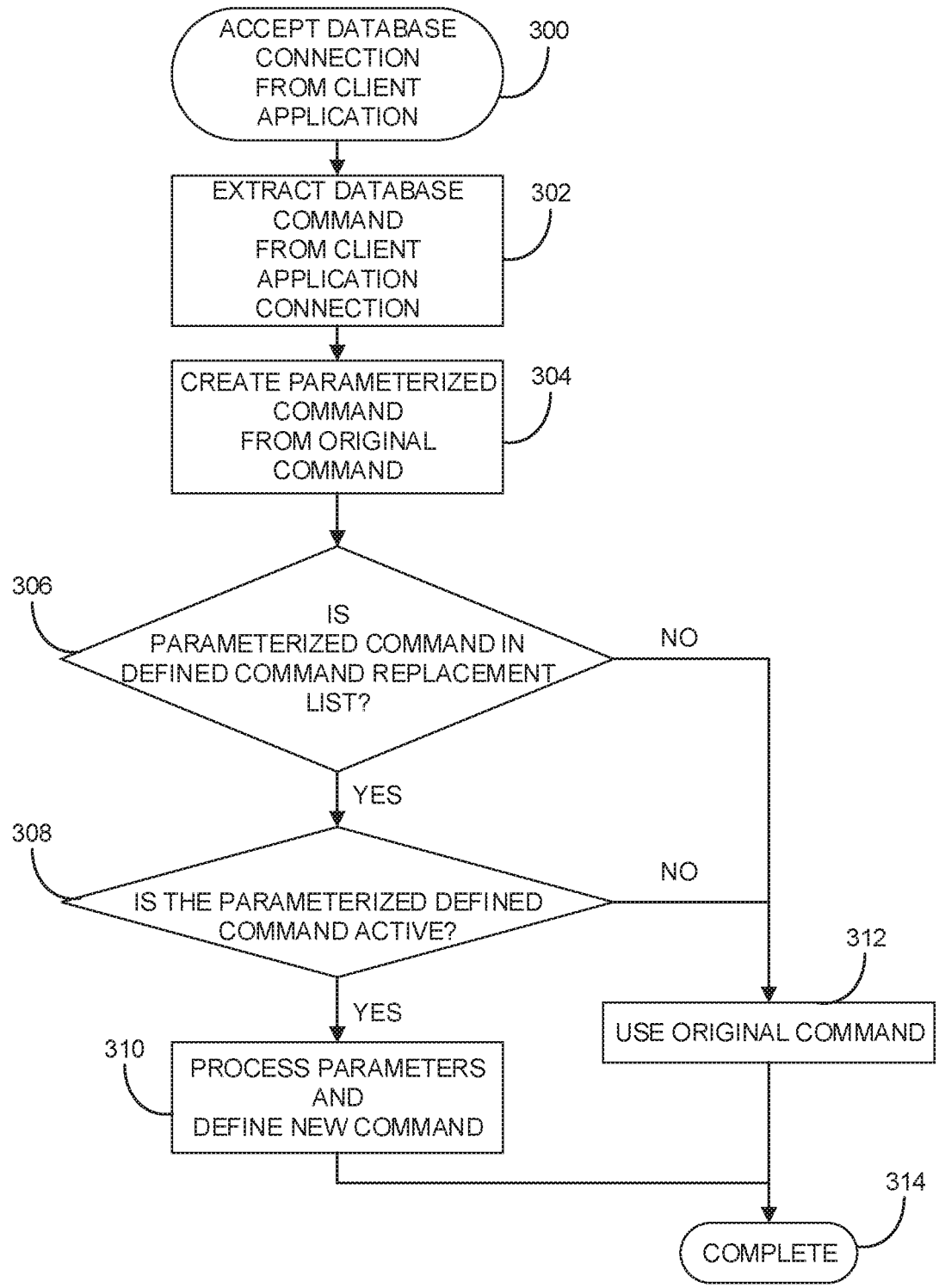
FIG. 3A shows a flowchart of a command replacement process according to one embodiment of the present disclosure.
Figure 3B:
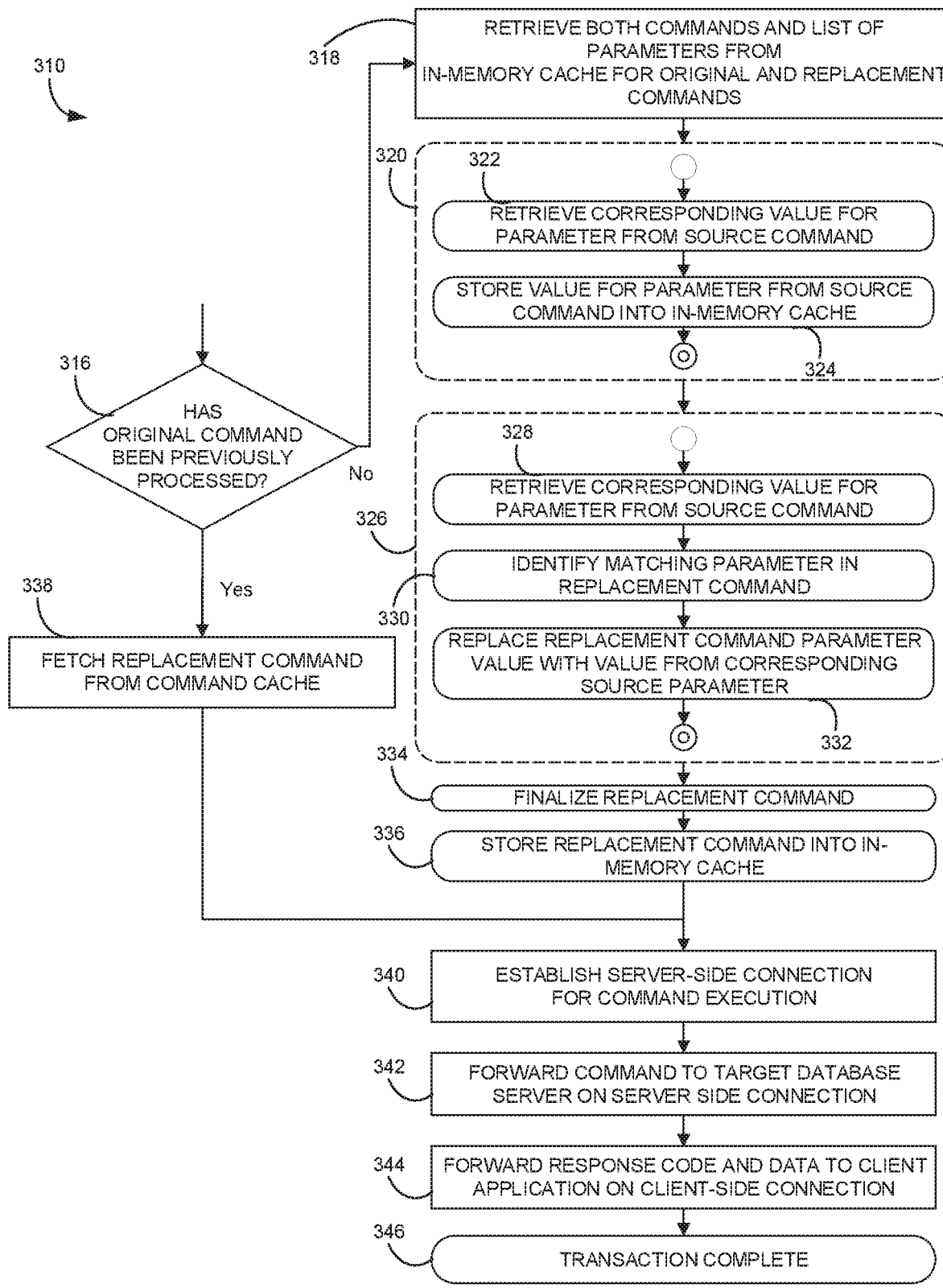
FIG. 3B shows a flowchart of a command replacement process according to one embodiment of the present disclosure.

Referring to FIGS. 3A and 38, a flowchart of a command replacement process according to one embodiment of the present disclosure is shown. A database command replacer, continuously executing as a software module on a database server or other hardware in the data path between one or more clients and one or more database servers in a networked client/server environment for database operations, listens for incoming database connections on a predefined network port. If an incoming command is present, the software module accepts 300 the database command from the client application as if it were the destination database server. The database communication stream is then parsed to extract the database command 302 which may comprise a database formatting instruction, data query, etc. Once a command is identified and extracted 302, the software module creates 304 a parameterized command from the extracted database command to genericize the database command. The parameterized command includes the functional aspects of the command as well as the arguments or parameters necessary to actually execute the command on the connected database server.

For example; a specific, routine query to return new system users created in a computer application on or after a particular date is defined by:

SELECT*FROM dbo.UsersTable WHERE CreationDate>='2018-10-01'

The functional aspects of the database command include returning all fields from the dbo.UsersTable table, for records with a creation data after a specific data, but the specific date actually given is only a parameter of the command, Command replacement may be genericized to identify replaceable commands based on the functional portion, regardless of the specific parameters. The present example may be genericized to allow for the detection of any date; each query parameter is therefore extracted, identified, and stored. The identified parameters are then replaced with a token to identify the parameter. In the present example, the genericized command may be:

SELECT*FROM dbo.UsersTable WHERE CreationDate>={PARAMETER1}:

The software module determines 306 if the parameterized command is enumerated in a defined command replacement list. The command replacement list may comprise a data structure of known database commands that may be received associated with alternative commands or execution strings, including the formulation for any alterations to parameters of the database command, designed to produce substantially similar results with more efficient execution with respect to time and resource allocation. In at least one embodiment, the command replacement list may include replacement database commands including specific parameter ranges. Determining 306 whether a parameterized command is enumerated may include determining if the actual parameter values fall within a parameter range.

Example Database Commands/Replacement Commands

| Original Database Command | Replacement Command |
|---|---|
| SELECT * FROM dbo.tbl_Users WHERE DateCreated >= '2019-10-01' | SELECT * FROM dbo.tbl_Users WHERE DateCreated >= CAST('2019-10-01' AS DATE) |
| SELECT P. * FROM dbo.tbl_Users U JOIN dbo.tbl_PhoneNumber P on U.UserID = P.UserID WHERE U.UserID = 12345 HERA 18-1-2 | SELECT P.PhoneNumber, P.PhoneNumberType FROM dbo.tbl_Users U JOIN dbo.tbl_PhoneNumber P on U.UserID = CAST(P.UserID AS BIGINT) WHERE U.UserID = 12345 |
| EXEC dbo.CPURightSizing_V1 @ServerID=5. @StartDate='2019-10-01', @EndDate='2019-11-01' | EXEC dbo.CPURightSizing_V1_MODIFIED @ServerID=5, @StartDate='2019-10-01', @EndDate='2019-11-01' |
| SELECT * FROM dbo.tbl_Users (NOLOCK) WHERE IsActive = 'Y' and CustomerID = 1 | SELECT * FROM dbo.tbl_Users WHERE IsActive = 'Y' and CustomerID = 1 |
| SELECT * FROM dbo.tBL_Users WITH (INDEX(AK_Users_Active)) WHERE | SELECT * FROM dbo.tbl_Users WHERE IsActive = 'Y' and CustomerID = 1 OPTION (MAXDOP 1) |

-continued

Example Database Commands/Replacement Commands

| Original Database Command | Replacement Command |
| --- | --- |
| IsActive = 'Y' and CustomerID = 1 OPTION (TABLE HINT(tbl_Users, INDEX (AK_Users_RowID))) SELECT dbo.FormatPhoneNumber(PhoneNumber) as PhoneNumber, PhoneNumberType FROM dbo.PhoneNumber WHERE PersonID = 123456 AND IsActive= 'Y' ORDER BY PhoneNumber ASC | SELECT dbo.FormatPhoneNumberInternational(PhoneNumber) as PhoneNumber, PhoneNumberType FROM dbo.PhoneNumber WHERE PersonID = 123456 AND IsActive= 'Y' ORDER BY PhoneNumber ASC |

Certain database command/replacement command pairs may be defined by type conversions of certain parameters. For example, in the list above, SELECT*FROM dbo.tbl_Users WHERE DateCreated>='2019-10-01' includes a type conversion of the date parameter from a var type (string) to a date/time type: SELECT*FROM dbo.tbl_Users WHERE DateCreated>=CAST('2019-10-01' AS DATE). It should be appreciated that the forgoing exemplary database command replacement command pairs are illustrative of the concept and not in any way limiting.

In at least one embodiment, if the database command appears on the command replacement list, the software module determines 308 if the parameterized, defined command is currently active, if so, the software module processes 310 the parameters from the database command, defines a new command including the parameters (or alternative parameters configured to produce substantially similar results) and sends the new command to the database server or cluster, completing 314 the replacement process.

Alternatively, any command the is not currently active or not in the defined command replacement list is passed through 312 as if no pre-processing was performed. The original command is sent to the database server, completing 314 the replacement process. In at least one embodiment, the system may log passed through commands and record execution time base on when a command was received and when a response is returned to identify potentially problematic commands for later review.

In at least one embodiment, the step of processing 310 parameters and defining a new command includes the step of determining 316 if the command has been previously processed. If not, the software module retrieves 318 a list of commands and corresponding parameters from a cache of original and replacement commands.

In at least one embodiment, a caching process 320 (for example, a threaded process executing as part of or in parallel with the software module) continuously receives genericized database commands with corresponding parameters. The process 320 retrieves 322 a value corresponding to a genericized parameter (in the present example, {PARAMETER1} is received and associated with the value '2018-10-01'). The genericized parameter and value are stored 324 in cache.

In at least one embodiment, a parameter retrieval process 326 (for example, a threaded process executing in parallel with the caching process 320) continuously retrieves 328 the value corresponding to the genericized parameter and identifies 330 a matching parameter in a replacement command. In at least one embodiment, the matching parameter may be a transformed to correspond to the replacement command. For example, if it were known that a query including a data parameter executed more efficiently by searching for dates greater than a specified data rather than dates greater than or equal to the specified data, the parameter corresponding to the specified data may be decremented and the more efficient operator used in a replacement command.

In at least one embodiment, database commands and corresponding replacement commands are defined and parameterized by system administrators as part of an initial process for creating associated command pairs. The parameters retrieved from the original command are mapped 332 to the intended parameter key in the replacement command. The values from the parameter map are applied to overwrite corresponding parameter value stubs in the replacement command, and the final replacement command is created 334. A copy of this replacement query, the original query, and the parameter map is stored 336 in a replacement command cache, associated with the original command and parameters, to improve performance of future executions of this specific command.

In at least one embodiment, if it is determined 316 that the command has been previously processed, a cached version of a replacement command with corresponding parameters is fetched 338 from the replacement command cache with reference to the original command and parameters.

In either event, a data connection to the appropriate database server is established 340 and the finalized replacement command is sent 342 to the database server for execution. The software module receives response codes and/or data from the database server in response to the replacement command and forwards 344 such response codes and/or data to the client-side application. The transaction is then completed 346.

Figure 4:
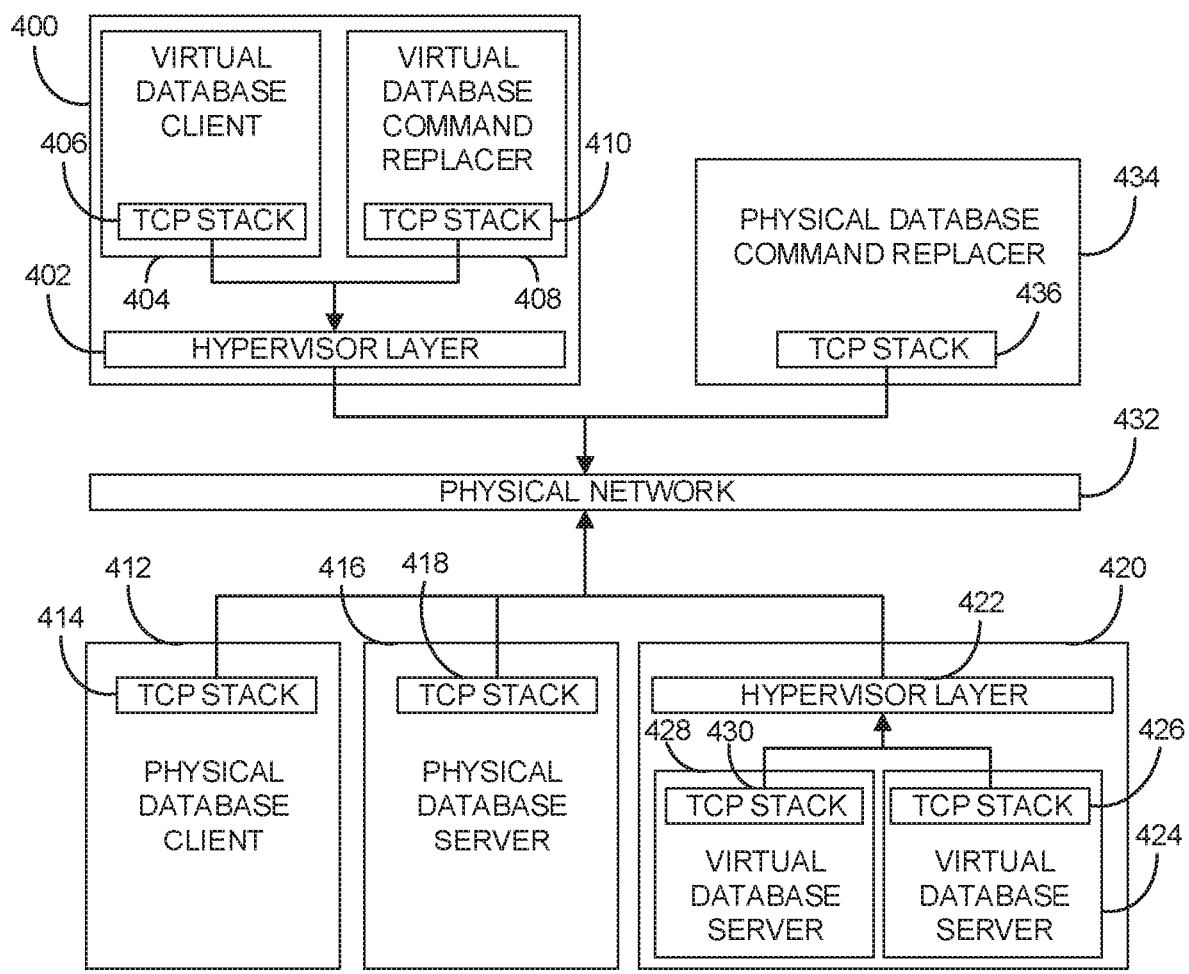
FIG. 4 shows a block diagram of a system suitable form implementing embodiments of the present disclosure.

Referring to FIG. 4, a block diagram of a system suitable form implementing embodiments of the present disclosure is shown. In at least one embodiment, certain of the elements of the system may be virtual devices. In one exemplary embodiment, an enclosure 400 encompasses a virtual client 404 executing on a virtual machine and a virtual database command replacer 408, also executing on a virtual machine. The virtual client 404 and virtual database command replacer 408 may each include a virtual network for communicating internally with each other and with outside real or virtual machines via a physical network 432. In at least one embodiment, the virtual client 404 and virtual database command replacer 408 may share a hypervisor layer 402.

In at least one embodiment, an enclosure 420 encompasses one or more virtual database servers 424, 428, executing on one or more virtual machines. The virtual database servers 424, 428 may each include a virtual network for communicating internally with each other and with outside real or virtual machines via the physical network 432. In at least one embodiment, the virtual database servers 424, 428 may share a hypervisor layer 422.

In at least one embodiment, the system may include one or more physical clients 412, one or more physical database servers 416, and one or more physical database command replacers 434 separate from the virtual clients 404 and virtual database command replacer 408. Each physical client 412, physical database server 418, and database command replacer modules 434 may include a network interface element, physical or virtual, for data communication with other elements of the system through the physical network 432.

In at least one embodiment, where a virtual database command replacer 408 is associated with one or more virtual clients 404, the virtual database command replacer 408 may be configured to intercept and process database commands from the virtual database clients 404 as described herein, and communicate directly with the physical database server 416 and virtual database servers 424, 428, A physical database command replacer 434 not directly associated with any virtual clients 404 is configured to intercept traffic between any physical database clients 412 and physical database servers 416 or virtual database servers 424, 428 by listening to the appropriate ports.

Data communication between the components may be by any manner of physical network, including for example wired or wireless Ethernet, cable, fiber, Win, WiMax, Cellular, ATM, LAN, WAN, or combinations of these or others. Furthermore, various networking hardware, including routers, bridges, radios, and other intervening network components, may be present but are not shown for clarity.

Each of the components (clients, servers, and database command replacers) communicate with the network via a "network port". As used herein, a "network port" can be physical or virtual, but it includes an address or point of presence at which it can be reached by other components on the network. Because the network is based on IP, each network port has a respective IP address and port number combination at which it can be reached by other components on the network. Through network address translation and other technologies, the IP address and port number to which a sending component sends a message may not be the same IP address and port number as the ultimate destination. However, as used herein, two IP address and port number combinations are "the same" if network routing is set such that if the sender sends a message to a first IP address and port number combination, it will be routed to a second IP address and port number.

Because the system in FIG. 4 is TCP/IP-based, each component communicates through its port via a respective TCP stack 406, 410, 414, 418, 426, 430, 436.

Figure 5:
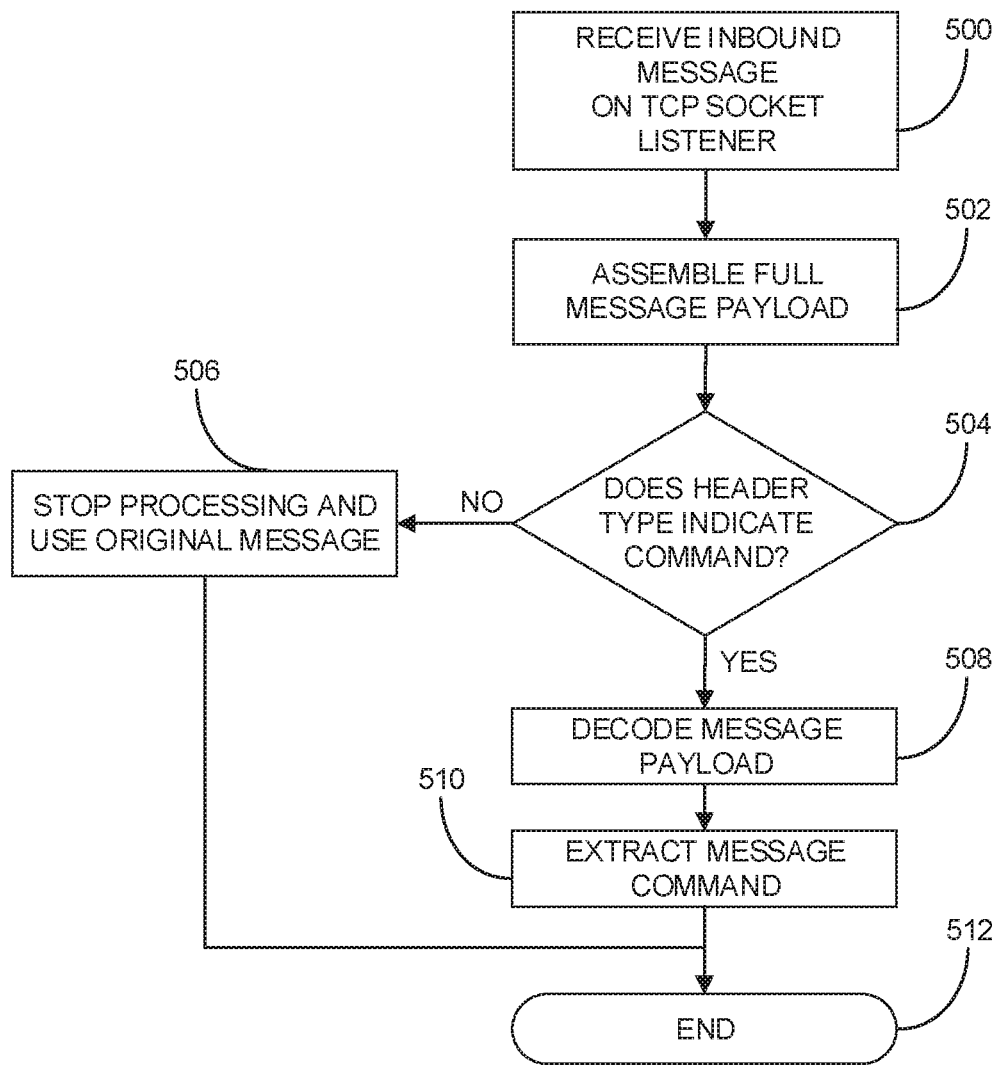
FIG. 5 shows a flowchart of a process for determining a message type according to one embodiment of the present disclosure.

Referring to FIG. 5, a flowchart of a process for determining a message type according to one embodiment of the present disclosure is shown. A database command replacer receives 500 an inbound communication request from a database client on a TCP stack socket listener. The inbound communication request is assembled 502 to form a complete communication message. The database command replacer determines 504 if a header record of the message indicates that the message contains a database command; if not, the database command replacer stops 506 processing and immediately forwards to message (which may include items such as connection create or authentication), if the header does indicate a database command, the message is decoded 508 and the full database command is extracted 510. The identification process is then terminated 512 and the database command may be further processed as set forth herein.

Figure 6:
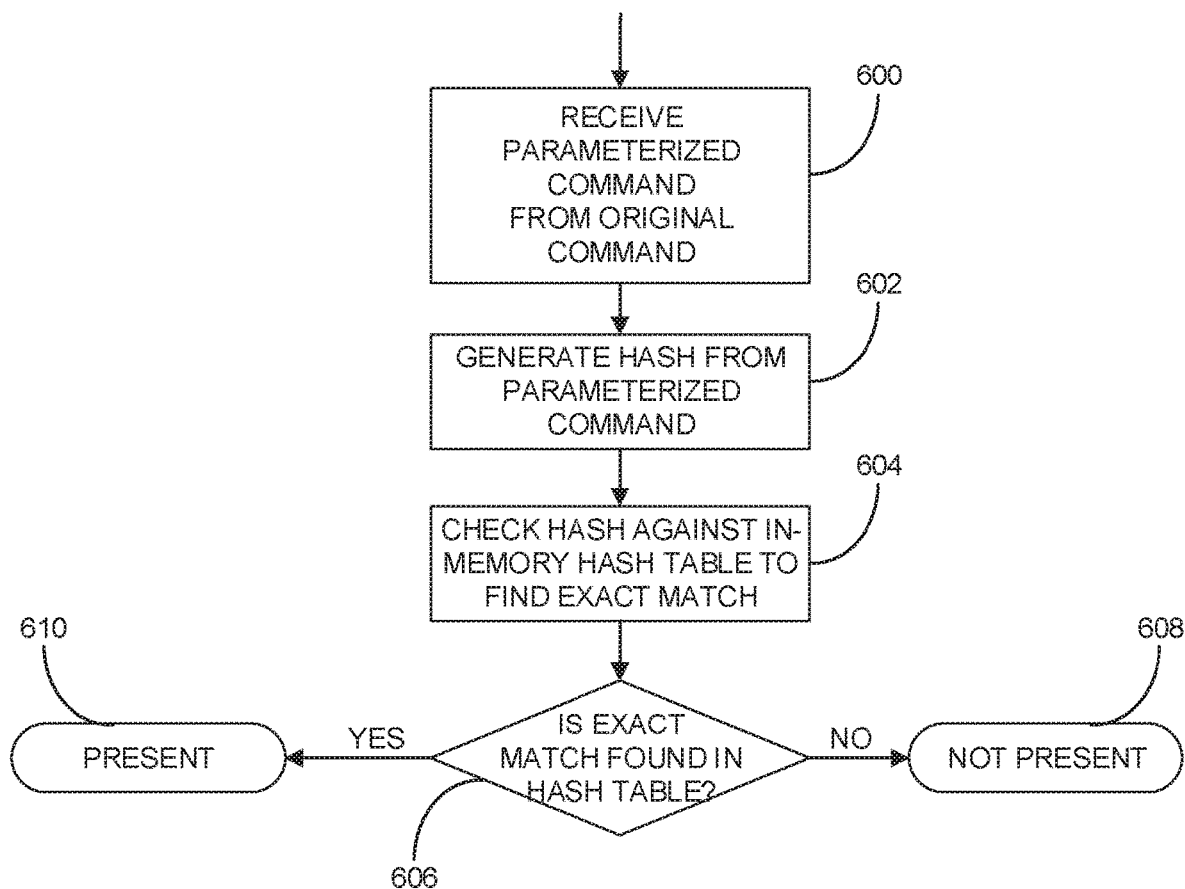
FIG. 6 shows a flowchart of a process for determining if a message has been flagged for replacement according to one embodiment of the present disclosure.

Referring to FIG. 6, a flowchart of a process for determining if a message has been flagged for replacement according to one embodiment of the present disclosure is shown. The database command replacer receives 600 the original command with specific parameters removed and stored. In at least one embodiment, a hash value is generated 602 from the parameterized original command to improve speed of lookup. The hash is then checked 604 against an in-memory hash table to find an exact match to determine 606 if the command has been previously defined by an administrator. The defined commands are stored in an in-memory hash table as a "hash map" using key-value pairs in which the key is the hash and the value contains at least: a pointer to the buffer in memory containing the record having the original and replacement commands and a list of all parameters that are to be mapped during command replacement. If the parameterized command is matched against an entry in this hash map, then the replacement command is present 610 in the in-memory cache, and the hash map key value is retrieved to define the database command replacement and parameter mapping as more fully described herein. If the parameterized command is not matched against an entry in this hash map, then a replacement command is not present 608 and the original command may be passed through.

Figure 7:
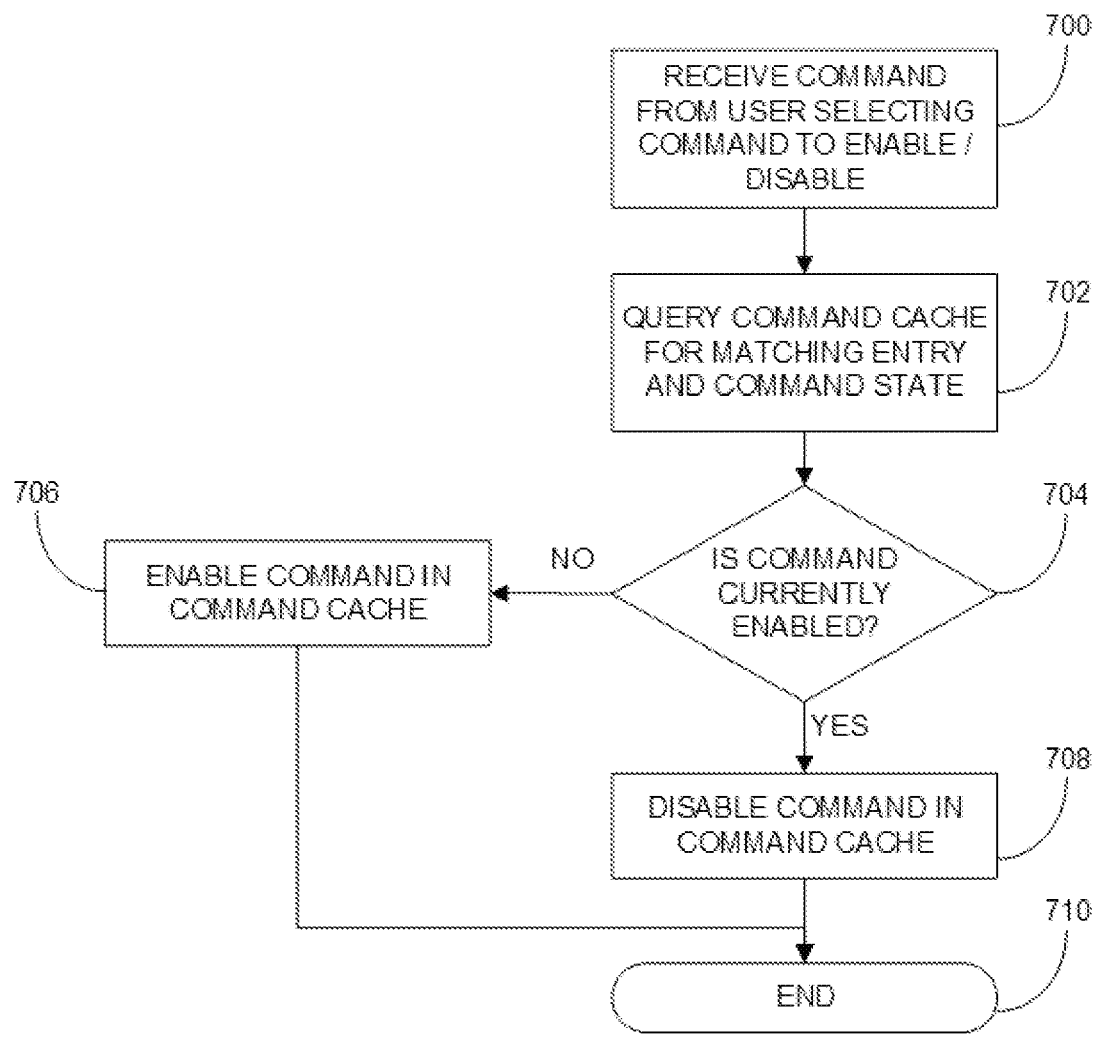
FIG. 7 shows a flowchart of a process for selectively enabling or disabling a command replacement entry according to one embodiment of the present disclosure.

Referring to FIG. 7, a flowchart of a process for selectively enabling or disabling a command replacement entry according to one embodiment of the present disclosure is shown. The database command replacer receives 700 an instruction from an administrator using an administrative management interface to select a previously defined replacement command. The system queries 702 a command cache of database command replacement entries and determines 704 if the selected command is currently enabled. If the command is currently disabled, an associated state is set 706 to enabled; and if the command is currently enabled, the associated state is set 708 is set to disabled. The updated command entry is then stored in the in-memory cache in the command replacer and the process ends 710.

Figure 8:
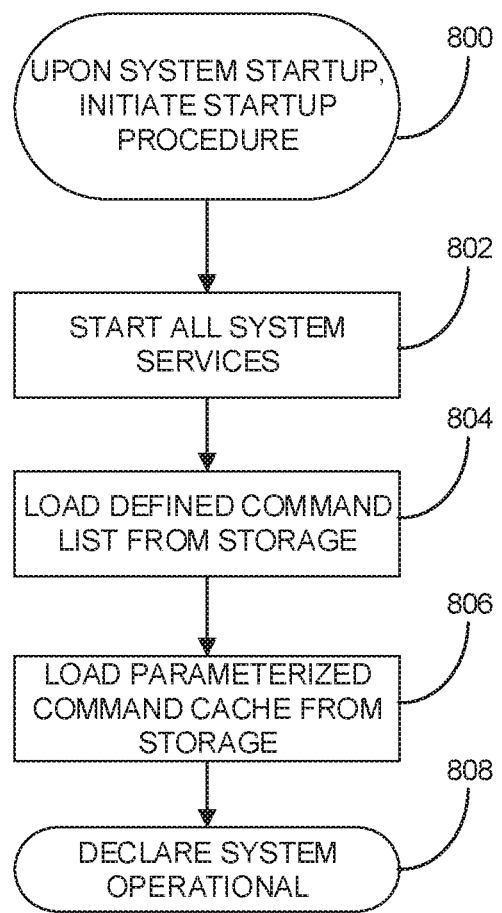
FIG. 8 shows a flowchart of a process for restoring data from persistent storage into memory cache according to one embodiment of the present disclosure.

Referring to FIG. 8, a flowchart of a process for restoring data from persistent storage into memory cache according to one embodiment of the present disclosure is shown.

Upon a system startup, all system services are started 800. All system services are started 802 and a list of defined database commands and their respective parameter maps are loaded 804 from persistent storage into memory, Any parameterized commands that were previously cached are loaded 806 from persistent storage into memory. Once these items are loaded into the in-memory cache, the system is operational 808 and ready to begin database command replacement.

Figure 9:
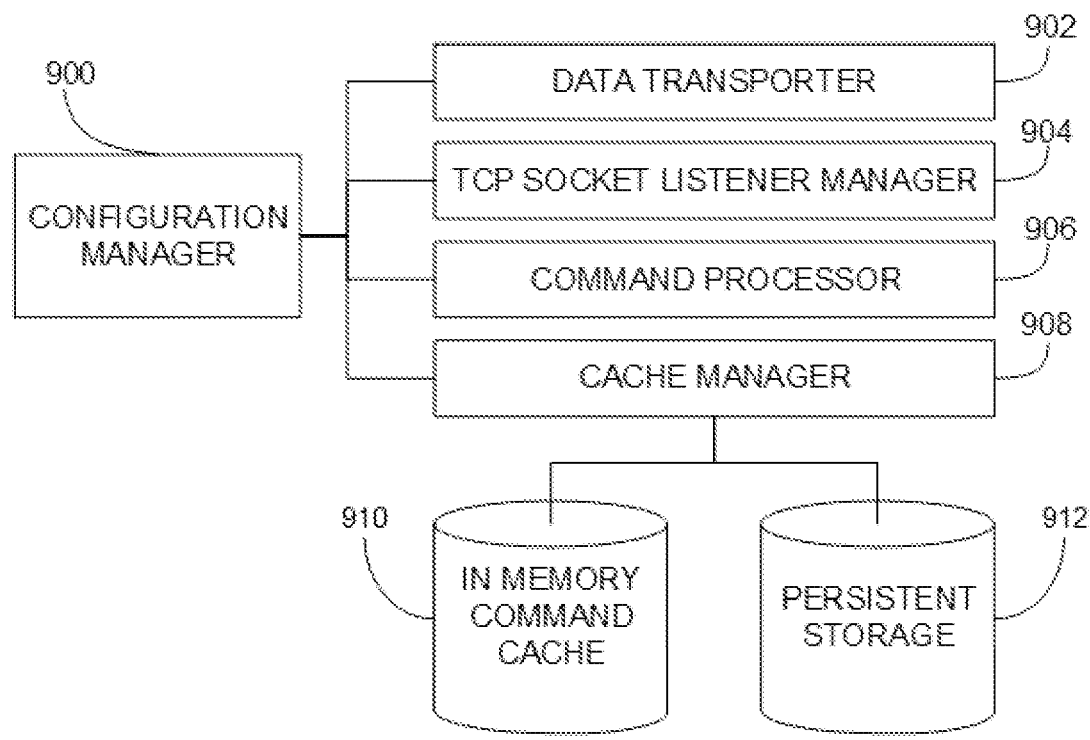
FIG. 9 shows a block diagram of software modules suitable for implementing embodiments of the present disclosure.

Referring to FIG. 9, a block diagram of software modules suitable for implementing embodiments of the present disclosure is shown. The software modules may include a configuration manager 900 that allows administrators to manage configurations and network settings of the command replacer, to add or modify target database servers, and to define all database commands and their corresponding replacement commands, plus the parameter map for each command. In at least one embodiment, the configuration manager 900 allows an administrator to load predefined modules of database commands and corresponding replacement commands. Such predefined modules may be database specific based on the known architecture of the database, application specific based on the known commands associated with an application, hardware specific based on a known physical server architecture (for example, data storage and access from a RAID architecture), etc. The predefined modules define database command replacement command relationships, including all parameter features as described herein.

A data transporter 902 allows database command messages to be relayed from a database client system to a database server and back. The data transporter enables client applications to connect transparently to the intended database server itself, rather than an intermediary device.

A TCP socket listener manager 904 maintains and manages various connections created by database clients to the intended database servers. The TCP socket listener manager 904 is responsible for listening for inbound connections and forwarding finalized database commands to a destination database server.

A command processor 906 maintains a list of all defined parameterized queries slated for replacement, an associated replacement parameterized command, and a map of all parameters that are to be mapped between source and replacement commands. The command processor 906 is in data communication with the other components and leverages their functionality to perform the in-line replacement of the commands.

A cache manager 908 maintains an in-memory cache 910 of replacement commands that the command processor 906 and configuration manager 900 use for functionality as described herein. The cache manager 908 also performs intermittent persistence of changed objects from the in-memory cache to persistent storage 912. The cache manager 908 manages data in both the in-memory cache 910 and persistent storage 912.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of theft material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
a database server;
a database command replacer configured to:
listen to a TCP/IP port corresponding to the database server;
receive a message directed to the database server from a database client through the TCP/IP port;
determine if the message comprises a database command in a set of database commands defined for replacement;
retrieve a replacement command associated with the database command from the set of database commands;
forward the replacement command to the database server;
receive a response from the database server;
forward the response to the database client; and
cache the replacement command and all corresponding parameters in a data structure associating the replacement command to the database command.

2. The computer apparatus of claim 1 wherein:
the database command replacer is further configured to:
identify one or more parameters in the database command;
replace the one or more parameters with generic placeholders; and
map the one or more parameters to parameters in the replacement command; and
replacing the one or more parameters with generic placeholders is performed before determining if the message comprises a database command in the set of database commands defined for replacement.

3. The computer apparatus of claim 2, wherein:
the database command replacer is further configured to:
identify a parameter range associated with database command replacement; and
determine if one or more parameters is within the parameter range; and
the parameter range defines a range of values for a parameter in a database command where execution of a replacement command is more efficient within the parameter range.

4. The computer apparatus of claim 1, wherein determining if the message comprises a database command in a set of database commands defined for replacement comprises identifying a header in the message and determining if the header indicates a database command.

5. The computer apparatus of claim 1, wherein the database command replacer is further configured to:
determine that the database command and all corresponding parameters were previously received and cached; and
retrieve the cached replacement command and corresponding parameters from an in-memory cache associating previously received database commands with replacement commands.

6. A method for improving performance of a database server system comprising:
listening to a TCP/IP port corresponding to a database server;
receiving a message directed to the database server from a database client through the TCP/IP port;
determining if the message comprises a database command in a set of database commands defined for replacement;
identifying one or more parameters in the database command;
replacing the one or more parameters with generic placeholders;
retrieving a replacement command associated with the database command from the set of database commands;
mapping the one or more parameters to parameters in the replacement command;
forwarding the replacement command to the database server;
receiving a response from the database server; and
forwarding the response to the database client,
wherein replacing the one or more parameters with generic placeholders is performed before determining if the message comprises a database command in the set of database commands defined for replacement.

7. The method of claim 6, further comprising modifying one or more of the parameters before mapping.

8. The method of claim 6, further comprising
identifying a parameter range associated with database command replacement; and
determining if one or more parameters is within the parameter range, wherein the parameter range defines a range of values for a parameter in a database command where execution of a replacement command is more efficient within the parameter range.

9. The method of claim 6, wherein determining if the message comprises a database command in a set of database commands defined for replacement comprises identifying a header in the message and determining if the header indicates a database command.

10. The method of claim 6, further comprising caching the replacement command and all corresponding parameters in a data structure associating the replacement command to database command.

11. The method of claim 10, further comprising:
determining that the database command and all corresponding parameters were previously received and cached; and
retrieving the cached replacement command and corresponding parameters from an in-memory cache associating previously received database commands with replacement commands.

12. A system comprising:
at least one database client;
at least one database server;
a database command replacer configured to:
listen to a TCP/IP port corresponding to one of the at least one database server;
receive a message directed to the database server from one of the at least one database client through the TCP/IP port;
determine if the message comprises a database command in a set of database commands defined for replacement;
retrieve a replacement command associated with the database command from the set of database commands;
forward the replacement command to the database server;
receive a response from the database server;
forward the response to the database client; and
cache the replacement command and all corresponding parameters in a data structure associating the replacement command to the database command.

13. The system of claim 12, wherein:
the database command replacer is further configured to:
identify one or more parameters in the database command;
replace the one or more parameters with generic placeholders; and
map the one or more parameters to parameters in the replacement command; and
replacing the one or more parameters with generic placeholders is performed before determining if the message comprises a database command in the set of database commands defined for replacement.

14. The system of claim 12, wherein:
at least one of the at least one database clients is a virtual client; and
the database command replacer is a virtual database command replacer associated with the virtual database client.

15. The system of claim 12, wherein at least one of the at least one database servers is a virtual server.

16. The system of claim 12, wherein determining if the message comprises a database command in a set of database commands defined for replacement comprises identifying a header in the message and determining if the header indicates a database command.

17. The system of claim 12,
wherein the database command replacer is further configured to:
determine that the database command and all corresponding parameters were previously received and cached; and
retrieve the cached replacement command and corresponding parameters from an in-memory cache associating previously received database commands with replacement commands.

* * * * *